May 25, 1926.
H. C. SMITH
ROLL
Filed Dec. 4, 1922
1,585,696
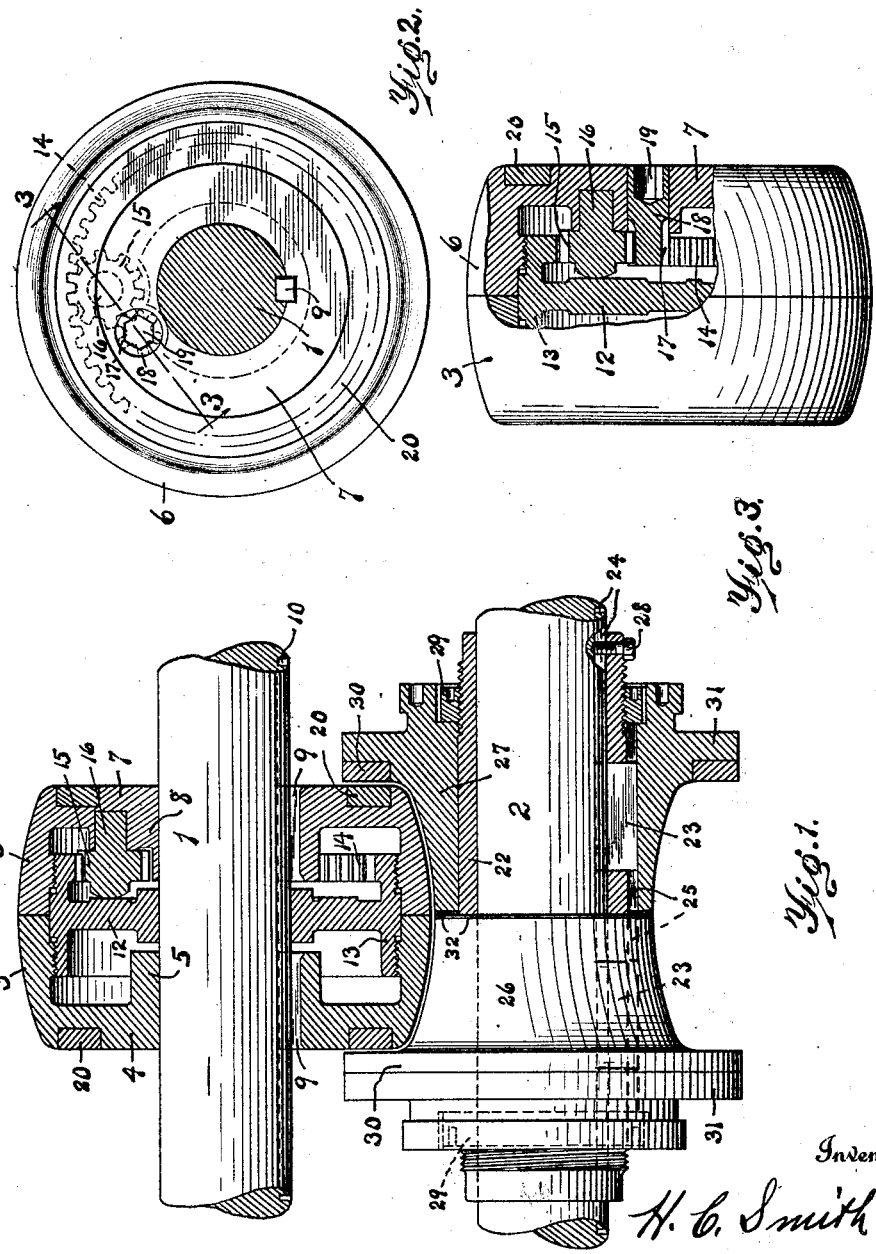

Patented May 25, 1926.

1,585,696

UNITED STATES PATENT OFFICE.

HENRY COLLIER SMITH, OF ST. MARYS, OHIO.

ROLL.

Application filed December 4, 1922. Serial No. 604,721.

This invention relates to rolls adapted to bend flat strips or sheets of metal to produce troughs, vehicle fenders and other channels, and its object is to provide a pair of rolls which may be adjusted relative to each other to accommodate them to sheet metal of different thicknesses.

A further object of this invention is to provide rolls of this character with loose wearing rings so as to reduce friction to a minimum and which can be moved outward as the faces of the rings wear by using liners behind the rings and which after being sufficiently worn can be readily removed and replaced.

In the accompanying drawing, Fig. 1 is a view, partly in section and partly in elevation, of these improved rolls. Fig. 2 is an end elevation of one of these rolls. Fig. 3 is a front elevation thereof, parts being broken away, on the line 3—3 of Fig. 2.

Similar reference characters refer to like parts throughout the several views.

While the plane of the axes of the rolls may be at any desired angle to the vertical, I prefer to consider them in a vertical plane and the shaft 1 above the shaft 2. The upper or convex roll is formed of two parts, one consisting of a face portion 3 and the web 4 connecting to the hub 5, and the other consisting of the face portion 6 and the web 7 connecting to the hub 8. Each hub is formed with a seat for a spline 9 slidable in the key-way 10 in the shaft 1.

A connector consisting of a web 12 and rim 13 is formed with right and left handed threads to screw into the threaded inner ends of the face portions 3 and 6. One end of this rim is formed with internal teeth 14 meshing with the spur gear 15 on the stub shaft 16 journaled in the web 7. This spur gear 15 meshes with a small pinion 17 on the stub shaft 18 which is journaled in the web 7 and is preferably formed with an angular socket 19 to receive a tool whereby this shaft 18 and the spur gear 15 may be turned to turn the threaded rim 13 within the face portions of the roll and thus determine the length of the roll.

I prefer to form circular grooves in the outer surfaces of the webs 4 and 7 to receive the rings 20 which are slidable around in these grooves and are made of a material and hardness suitable for working any given kind of metal.

The lower or concave roll is fixed to the shaft against longitudinal movement. It embodies a sleeve 22 having radial slots to receive the splines 23 which extend into the key-way 24 in the shaft 3 and into the longitudinal grooves 25 in the main members 26 and 27 which are driven by the shaft by means of these splines. The sleeve may be prevented from moving endwise of the shaft by means of the set-screw 28.

The ends of the sleeve 22 are threaded and receive the collars 29 which determine the distance between the inner faces of the rings 30 which are supported by the flanges 31 on these main portions 26 and 27. If desired, rings 32 of sheet metal of any desired thickness may be placed between adjacent ends of the parts 26 and 27 of the concave roll in order that these parts may be locked securely in adjusted position. The rings 30 will preferably again be of suitable material and hardness and revoluble on the flanges 31.

The two parts of the convex roll are adjusted relative to each other by means of the intermediate member 12—13 until the outside length of the roll measured over the rings 20 equals the desired internal width of the channel to be formed. The inside width of the concave roll measured between the rings 30 equals the length of the convex roll plus twice the thickness of the sheet metal being worked.

The rings 20 and 30 can slide freely on the bodies of the rolls and this may avoid a great portion of the friction between the rolls and the flanges or side walls of the channels being formed, which would arise because of the unequal surface speeds of the rolls at these points. As the greatest wear normally occurs at the surfaces formed by these rings, the replaceable rings make for a great saving of expense.

By making the rolls in halves with loose wearing rings they can be moved forward by liners as they wear. It is practical to re-machine the rolls and rings from time to time by contracting the female roll and expanding the male roll in the manner described, thus providing surface material to true up, this re-machining of the parts being repeated until they become too small, it being understood that means are provided for bringing the shafts 1 and 2 closer together as the diameters of the rolls are reduced from time to time. Such machining is made necessary by unequal wearing of different portions of the surfaces of the rolls.

The details of construction and the proportions of the parts of these rolls may all be changed by those skilled in the art without departing from the spirit of my invention as set forth in the following claims.

I claim:—

1. A roll formed of an externally threaded central portion and two internally threaded end portions screwed onto the central portion, said externally threaded portion being formed with a ring of gear teeth, and a pinion rotatably mounted in said roll whereby said externally threaded portion may be turned.

2. A roll for forming sheet metal formed of an externally threaded central portion and two internally threaded end portions screwed onto the central portions, and independently rotatable means mounted in the roll to turn one of the end portions on the central portion to vary the length of the roll.

3. A roll for forming sheet metal comprising an end portion and a body portion, one of said parts being internally threaded and the other externally threaded to fit the internally threaded portion, said portions being relatively rotatable to vary the length of the roller, said externally threaded portion being formed with a ring of gear teeth, and a pinion rotatably mounted in the other portion of the roll whereby the two portions of the roll may be turned relative to each other.

4. The combination of a pair of rolls for forming sheet metal, one of said rolls having a convex face and the other a concave face, the convex roll being hollow and divided in a plane at an angle to the shaft on which it is mounted, one of the adjacent portions of the face of said convex roll being internally threaded left handed and the other right handed, an externally screwthreaded member within the convex roll adjustably connecting said adjacent screwthreaded portions and formed with a ring of internal gear teeth, and gears mounted in one end of said convex roll whereby the connecting member may be turned to adjust the length of said convex roll.

HENRY COLLIER SMITH.